(12) United States Patent
Su et al.

(10) Patent No.: US 10,670,846 B2
(45) Date of Patent: Jun. 2, 2020

(54) OPTICAL LENS

(71) Applicants: Young Optics Inc., Hsinchu Science Park (TW); NALUX CO., LTD., Osaka (JP)

(72) Inventors: Yuan-Hung Su, Hsinchu Science Park (TW); Sheng-Tang Lai, Hsinchu Science Park (TW); Kuo-Chuan Wang, Hsinchu Science Park (TW); Norihisa Sakagami, Hsinchu Science Park (TW)

(73) Assignee: YOUNG OPTICS INC., Hsinchu (TW)

( * ) Notice: Subject to any disclaimer, the term of this patent is extended or adjusted under 35 U.S.C. 154(b) by 161 days.

(21) Appl. No.: 15/670,493

(22) Filed: Aug. 7, 2017

(65) Prior Publication Data
US 2018/0164555 A1 Jun. 14, 2018

(30) Foreign Application Priority Data
Dec. 14, 2016 (TW) .............................. 105141416 A (51) Int. Cl.
| | |
|---|---|
| G02B 15/14 | (2006.01) |
| G02B 15/177 | (2006.01) |
| G02B 13/18 | (2006.01) |
| G02B 13/04 | (2006.01) |
| G02B 9/60 | (2006.01) |

(52) U.S. Cl.
CPC ............ *G02B 15/142* (2019.08); *G02B 9/60* (2013.01); *G02B 13/04* (2013.01); *G02B 13/18* (2013.01); *G02B 15/177* (2013.01)

(58) Field of Classification Search
CPC ...... G02B 15/161; G02B 15/177; G02B 9/60; G02B 13/04; G02B 13/18

USPC ......................................................... 359/691
See application file for complete search history.

(56) References Cited

U.S. PATENT DOCUMENTS

| | | | |
|---|---|---|---|
| 5,623,365 A * | 4/1997 | Kuba ................. | G02B 27/0043 359/565 |
| 7,298,561 B1 | 11/2007 | Yamashita et al. | |
| 7,933,078 B2 | 4/2011 | Jung et al. | |
| 8,699,150 B1 * | 4/2014 | Hsieh ................. | G02B 13/0045 359/714 |
| 9,116,330 B2 | 8/2015 | Abe | |

FOREIGN PATENT DOCUMENTS

CN 103869451 A 6/2014

OTHER PUBLICATIONS

Chinese Office Action based on corresponding Application No. 201710088453.8, dated Nov. 20, 2019.

* cited by examiner

*Primary Examiner* — Thomas K Pham
*Assistant Examiner* — Mitchell T Oestreich
(74) *Attorney, Agent, or Firm* — Muncy, Geissler, Olds & Lowe, P.C.

(57) ABSTRACT

An optical lens includes a first lens group with negative refractive power, a second lens group with positive refractive power, and an aperture stop disposed between the first lens group and the second lens group. A total number of lenses in the first lens group is less than three, and a total number of lenses in the second lens group is less than five. The second lens group includes a first lens, a second lens and a third lens arranged in order in a direction away from the aperture stop. Each of the first lens and the second lens is an aspheric lens, and one of the first lens and the second lens has a diffractive optical surface.

18 Claims, 11 Drawing Sheets

OPTICAL LENS

BACKGROUND OF THE INVENTION a. Field of the Invention

The invention relates generally to an optical lens, and more particularly to an optical lens having a diffractive optical element and 24-hours confocal image-capturing capability b. Description of the Related Art

Nowadays, as smart home surveillance cameras become more immersed in user's everyday lives, there is a growing need for these devices to become thinner and have high optical performance. To meet these requirements, an optical lens needs to have low fabrication costs, large aperture, wide viewing angles, lighter weight and 24-hours confocal image-capturing capability. In order to enhance the 24-hours confocal image-capturing capability, a conventional method is to use a low-dispersion lens material (such as Fluorite). However, Fluorite is heavy (about 1.5 times heavier than glass) and expansive (Fluorite costs about 18 times as much as glass), and thus such material fails to meet the requirements of low costs and lighter weight. Therefore, it is desirable to provide an optical lens that may achieve lighter weight, lower fabrication costs, good imaging quality and 24-hours confocal image-capturing capability.

BRIEF SUMMARY OF THE INVENTION

According to one aspect of the present disclosure, an optical lens includes a first lens group with negative refractive power, a second lens group with positive refractive power, and an aperture stop disposed between the first lens group and the second lens group. A total number of lenses in the first lens group is less than three, and a total number of lenses in the second lens group is less than five. The second lens group includes a first lens, a second lens and a third lens arranged in order in a direction away from the aperture stop. Each of the first lens and the second lens is an aspheric lens, and one of the first lens and the second lens has a diffractive optical surface.

According to another aspect of the present disclosure, an optical lens includes a first lens group, a second lens group, and an aperture stop disposed between the first lens group and the second lens group. The first lens group includes a lens having negative refractive power, and the second lens group includes a lens having positive refractive power. The second lens group includes a first lens, a second lens and a third lens arranged in order in a direction away from the aperture stop. The first lens is an aspheric lens, and one of the first lens and the second lens has a diffractive optical surface. A 587 nm green light passes the optical lens to form a first focal plane, the first focal plane crosses an optical axis of the optical lens to form a first intersection, a 850 nm infrared light passes the optical lens to form a second focal plane, the second focal plane crosses the optical axis of the optical lens to form a second intersection, and a displacement between the first intersection and the second intersection is less than 10 um.

The optical lens according to the above embodiment may achieve at least one advantage of lighter weight, lower fabrication costs, good imaging quality and 24-hours confocal image-capturing capability.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIGS. 2-5 show optical simulation results of the optical lens of FIG. 1.

FIGS. 7-10 show optical simulation results of the optical lens of FIG. 1.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
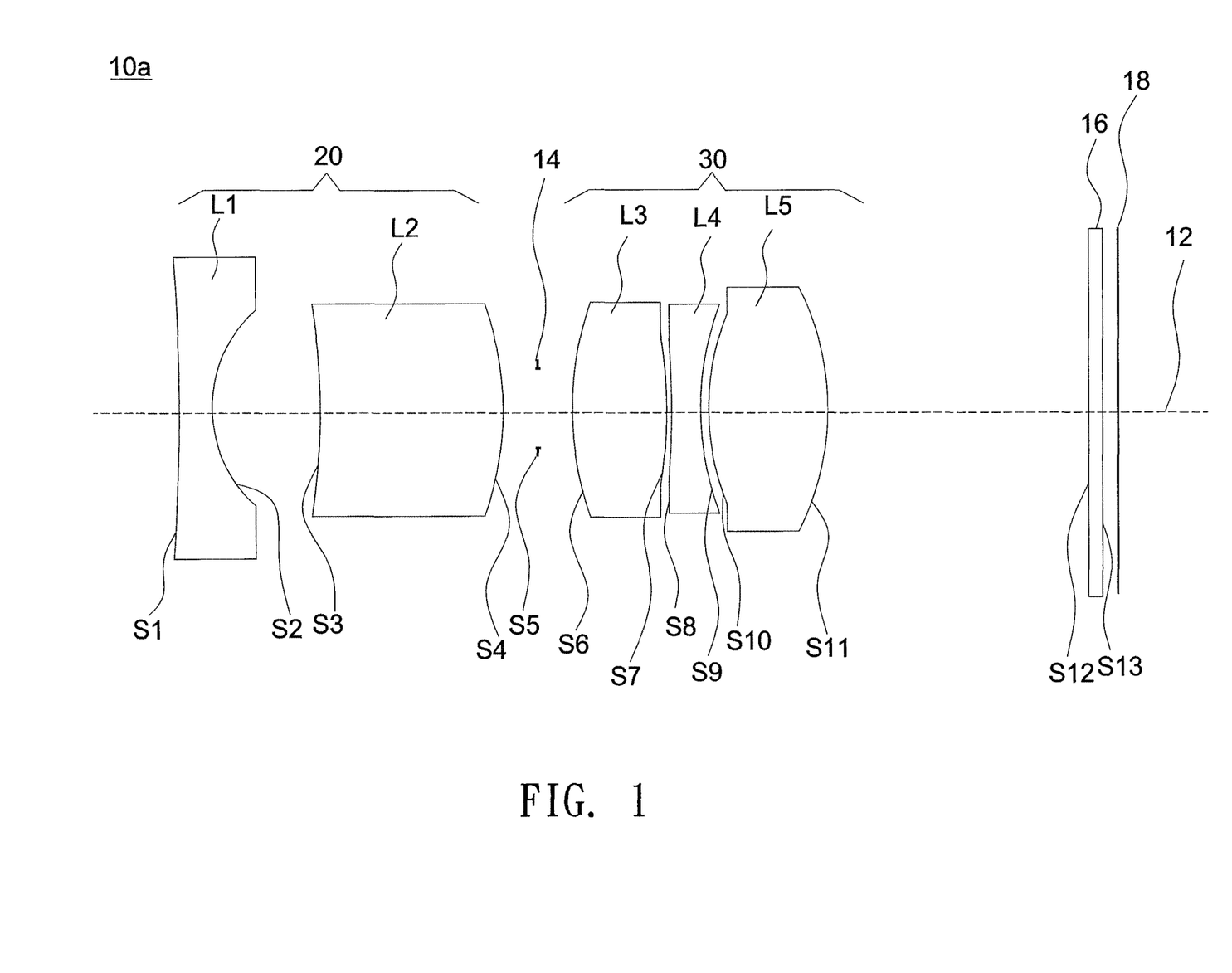
FIG. 1 shows a schematic diagram illustrating an optical lens according to an embodiment of the invention.
Figure 11:
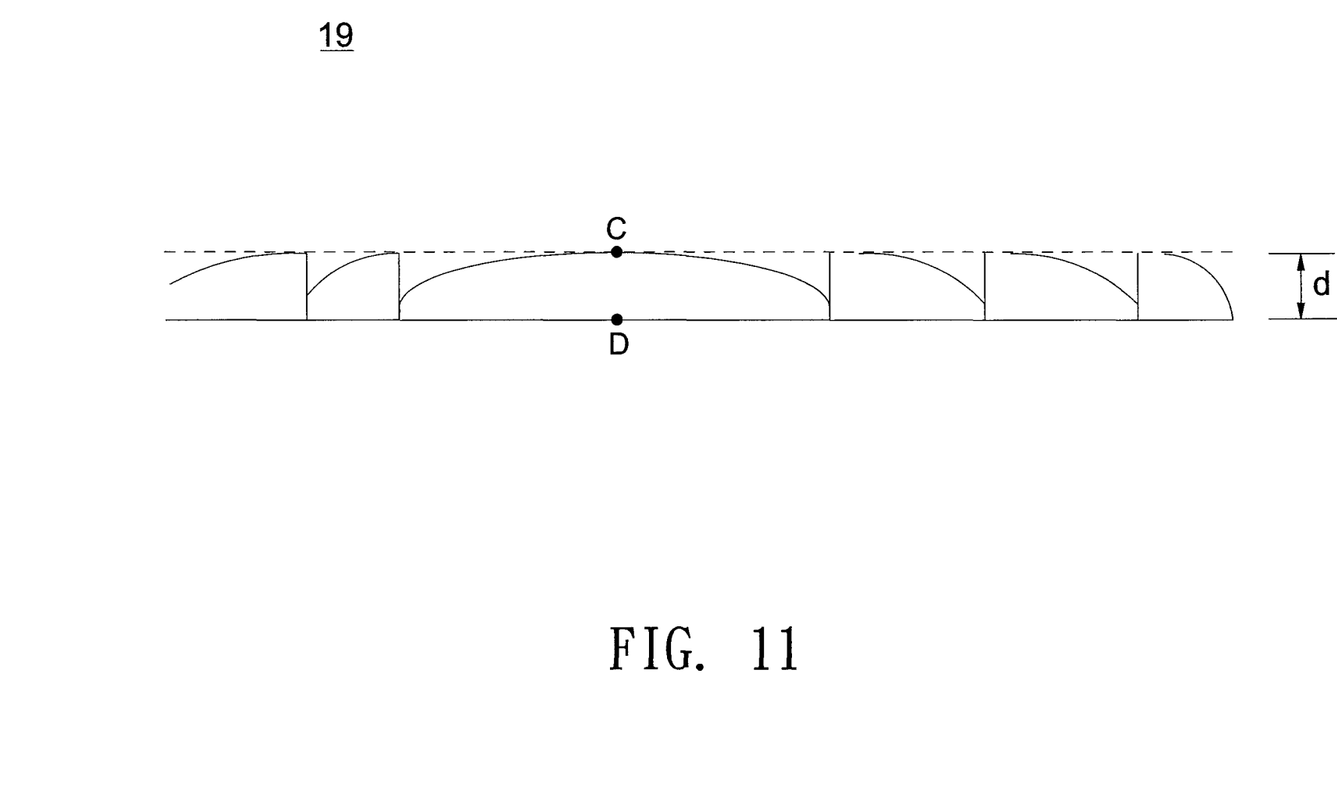
FIG. 11 shows a diffractive optical surface formed by a binary optics according to an embodiment of the invention.

FIG. 1 shows a schematic diagram illustrating an optical lens according to an embodiment of the invention. The optical lens 10a is disposed between a magnified side (such as an object side on the left of FIG. 1) and a minified side (such as an image side on the right of FIG. 1). As shown in FIG. 1, the optical lens 10a may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18. The cover glass 16 is disposed between the second lens group 30 and the image plane 18. The first lens group 20 may include a first lens L1 and a second lens L2 arranged in order, along an optical axis 12, from the magnified side to the minified side. The second lens group 30 may include a third lens L3, a fourth lens L4 and a fifth lens L5 arranged in order, along the optical axis 12, from the magnified side to the minified side. The refractive powers of the first lens L1 to the fifth lens L5 are negative, positive, positive, negative and positive. In this embodiment, the third lens L3 is an aspheric lens with a diffractive optical surface, the first lens L1, the second lens L2 and the fourth lens L4 are aspheric lenses, and the fifth lens L5 is a bi-convex lens. In one embodiment, aspheric lenses may be made by plastic injection or glass molding, but the invention is not limited thereto. A spherical lens indicates its front lens surface and rear lens surface are each a part surface of a sphere having a fixed radius of curvature. In comparison, an aspheric lens indicates at least one of its front lens surface and rear lens surface has a radius of curvature that varies along a center axis to correct abbreviations. Further, in one embodiment, the diffractive optical surface may be formed using binary optics technology as illustrated in FIG. 11. In one embodiment, the first lens L1 to the fifth lens L5 may be separate from each other. In an alternate embodiment, adjoining surfaces respectively on two adjacent lenses may have an identical or similar radius of curvature and may be joined together to form a cemented doublet, but the invention is not limited thereto. Note that the lenses in a cemented lens may be joined together by various ways. For example, the lenses may be cemented together by applying an optical adhesive on adjoining lens surfaces, or stacked with each other and then pressed by a mechanical piece to be fitted with each other. The detailed optical data of the optical lens 10a such as lens parameters, shape, aspheric coefficients and diffractive coefficients are shown in Tables 1-3 below. In the following design examples of the invention, each aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + \ldots, \quad (1)$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-B shown in Table 2 are 4th and 6th order aspheric coefficients.

In the following design examples of the invention, a diffractive optical surface polynomial may be expressed as the following:

$$\phi(r) = (2\pi/\lambda_0)\Sigma\, C_n r^{2n} \quad (2),$$

where $\Phi(r)$ denotes a phase function of a diffractive optical element, r denotes a radial distance relative to the optical axis of the optical lens, and $\lambda_0$ denotes a reference wavelength. That is, a diffractive optical surface is a lens surface superposed with a diffractive phase function. Parameters C1 and C2 shown in Table 3 are 2th and 4th order coefficients of the diffractive optical surface polynomial.

TABLE 1

| Surface | Radius (mm) | Thickness (mm) | Refractive index | Abbe number | Object description |
|---|---|---|---|---|---|
| S1 | −23.57 | 0.70 | 1.53 | 55.75 | L1 (aspheric) |
| S2 | 3.16 | 2.50 | | | |
| S3 | −25.92 | 4.25 | 1.63 | 23.34 | L2 (aspheric) |
| S4 | −7.90 | 1.01 | | | |
| S5 | ∞ | 0.71 | | | aperture stop |
| S6 | 8.50 | 2.23 | 1.53 | 55.75 | L3 (aspheric) |
| S7 | −10.73 | 0.10 | | | |
| S8 | −43.76 | 0.70 | 1.63 | 23.34 | L4 (aspheric) |
| S9 | 6.50 | 0.15 | | | |
| S10 | 6.59 | 2.86 | 1.44 | 94.95 | L5 (biconvex) |
| S11 | −5.56 | 7.36 | | | |
| S12 | ∞ | 0.61 | 1.52 | 64.17 | cover glass |
| S13 | ∞ | 0.05 | | | |
| | | | | | image plane |

Effective focal length (EFL) for visible light = 4.265 mm
Effective focal length (EFL) for NIR 850 nm light = 4.274 mm
F-Number = 2.0
Maximum field of view (FOV) = 116.1 degrees
Maximum image height of the image plane = 7.54 mm
Total track length TTL (distance between the surface S1 and the image plane) = 23.23 mm In the above Table 1, the field heading "thickness" represents a distance of two adjacent surfaces along the optical axis 12. For example, a thickness of the surface S1 is a distance between the surface S1 and the surface S2 along the optical axis 12, a thickness of the surface S2 is a distance between the surface S2 and the surface S3 along the optical axis 12, and a thickness of the surface S13 is a distance between the surface S13 of the cover glass 16 and the image plane 18 along the optical axis 12.

TABLE 2

| | S1 | S2 | S3 | S4 | S6 | S7 |
|---|---|---|---|---|---|---|
| K | 0 | 0 | 0 | 0 | 0 | 0 |
| A | 3.62E−04 | 1.34E−04 | −2.57E−04 | 8.98E−04 | −2.73E−03 | 3.25E−03 |
| B | −8.25E−06 | 4.13E−05 | 4.45E−05 | −9.29E−05 | 2.83E−05 | 1.95E−04 |

TABLE 2-continued

|   | S8 | S9 |
|---|---|---|
| K | 0 | 0 |
| A | −4.86E−04 | −1.10E−04 |
| B | 6.47E−05 | 4.58E−05 |

TABLE 3

|   | S7 |
|---|---|
| C1 | −5.74E−04 |
| C2 | 4.42E−06 |

Figure 6:
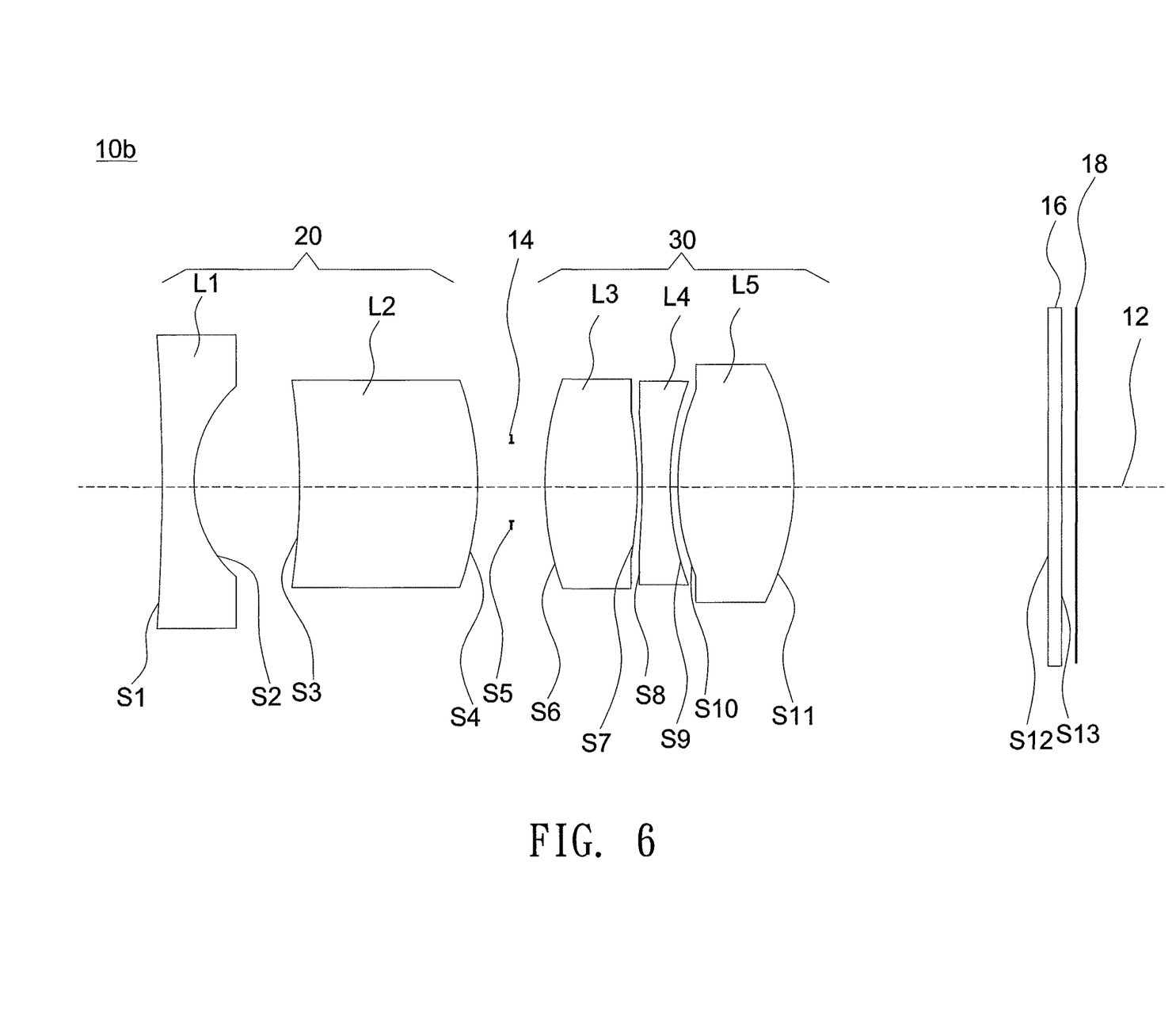
FIG. 6 shows a schematic diagram illustrating an optical lens according to another embodiment of the invention.

FIG. 6 shows a schematic diagram illustrating an optical lens 10b according to another embodiment of the invention. An optical lens 10b is disposed between a magnified side (such as an object side on the left of FIG. 6) and a minified side (such as an image side on the right of FIG. 6). As shown in FIG. 6, the optical lens 10b may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18 of the optical lens 10b. The cover glass 16 is disposed between the second lens group 30 and the image plane 18. The first lens group 20 may include a first lens L1 and a second lens L2 arranged in order, along an optical axis 12, from the magnified side to the minified side. The second lens group 30 may include a third lens L3, a fourth lens L4 and a fifth lens L5 arranged in order, along the optical axis 12, from the magnified side to the minified side. The refractive powers of the first lens L1 to fifth lens L5 are negative, positive, positive, negative, positive. In this embodiment, the third lens L3 is an aspheric lens with a diffractive optical surface, the first lens L1, the second lens L2 and the fourth lens L4 are aspheric lenses, and the fifth lens L5 is a bi-convex lens. In one embodiment, aspheric lenses may be made by plastic injection or glass molding, but the invention is not limited thereto. In one embodiment, the first lens L1 to the fifth lens L5 may be separate from each other. In an alternate embodiment, adjoining surfaces respectively on two adjacent lenses may have an identical or similar radius of curvature and may be joined together to form a cemented doublet, but the invention is not limited thereto. Note that the lenses in a cemented lens may be joined together by various ways. For example, the lenses may be cemented together by applying an optical adhesive on adjoining lens surfaces, or stacked with each other and then pressed by a mechanical piece to be fitted with each other. The detailed optical data of the optical lens 10b such as lens parameters, shape, aspheric coefficients and diffractive coefficients are shown in Tables 4-6 below. Parameters A-B shown in Table 5 are 4th and 6th order aspheric coefficients of aspheric surface polynomial (Equation 1). Parameters C1 and C2 shown in Table 6 are 2th and 4th order coefficients of the diffractive optical surface polynomial (Equation 2).

TABLE 4

| Surface | Radius (mm) | Thickness (mm) | Refractive index | Abbe number | Object description |
|---|---|---|---|---|---|
| S1 | −32.46 | 0.70 | 1.53 | 55.75 | L1 (aspheric lens) |
| S2 | 3.22 | 2.50 | | | |
| S3 | −16.90 | 4.24 | 1.64 | 23.97 | L2 (aspheric lens) |
| S4 | −7.07 | 1.45 | | | |
| S5 | ∞ | 0.71 | | | aperture stop |
| S6 | 8.51 | 1.82 | 1.53 | 55.75 | L3 (aspheric lens) |
| S7 | −10.73 | 0.10 | | | |
| S8 | −42.05 | 0.70 | 1.64 | 23.97 | L4 (aspheric lens) |
| S9 | 6.25 | 0.20 | | | |
| S10 | 6.59 | 2.86 | 1.44 | 94.95 | L5 (biconvex) |
| S11 | −5.56 | 6.38 | | | |
| S12 | ∞ | 0.61 | 1.52 | 64.17 | cover glass |
| S13 | ∞ | 1.00 | | | |
| | | | | | image plane |

Effective focal length (EFL) for visible light = 4.251 mm
Effective focal length (EFL) for NIR 850 nm light = 4.261 mm
F-Number = 2.0
Maximum field of view (FOV) = 117.7 degrees
Maximum image height of the image plane = 7.54 mm
Total track length TTL (distance between the surface S1 and the image plane) = 23.26 mm In the above Table 1, the field heading "thickness" represents a distance of two adjacent surfaces along the optical axis 12. For example, a thickness of the surface S1 is a distance between the surface S1 and the surface S2 along the optical axis 12, a thickness of the surface S2 is a distance between the surface S2 and the surface S3 along the optical axis 12, and a thickness of the surface S13 is a distance between the surface S13 of the cover glass 16 and the image plane 18 along the optical axis 12.

TABLE 5

|   | S1 | S2 | S3 | S4 | S6 | S7 |
|---|---|---|---|---|---|---|
| K | 0 | 0 | 0 | 0 | 0 | 0 |
| A | 7.05E−05 | 3.92E−04 | 2.12E−04 | 1.10E−03 | 2.60E−03 | 2.97E−03 |
| B | −2.97E−06 | 4.84E−05 | 1.37E−05 | −9.42E−05 | 5.41E−05 | 2.95E−04 |

|   | S8 | S9 |
|---|---|---|
| K | 0 | 0 |
| A | 2.34E−04 | 7.68E−04 |
| B | 1.16E−04 | 7.23E−07 |

TABLE 6

| | S7 |
|---|---|
| C1 | −5.74E−04 |
| C2 | 6.62E−06 |

Figure 2:
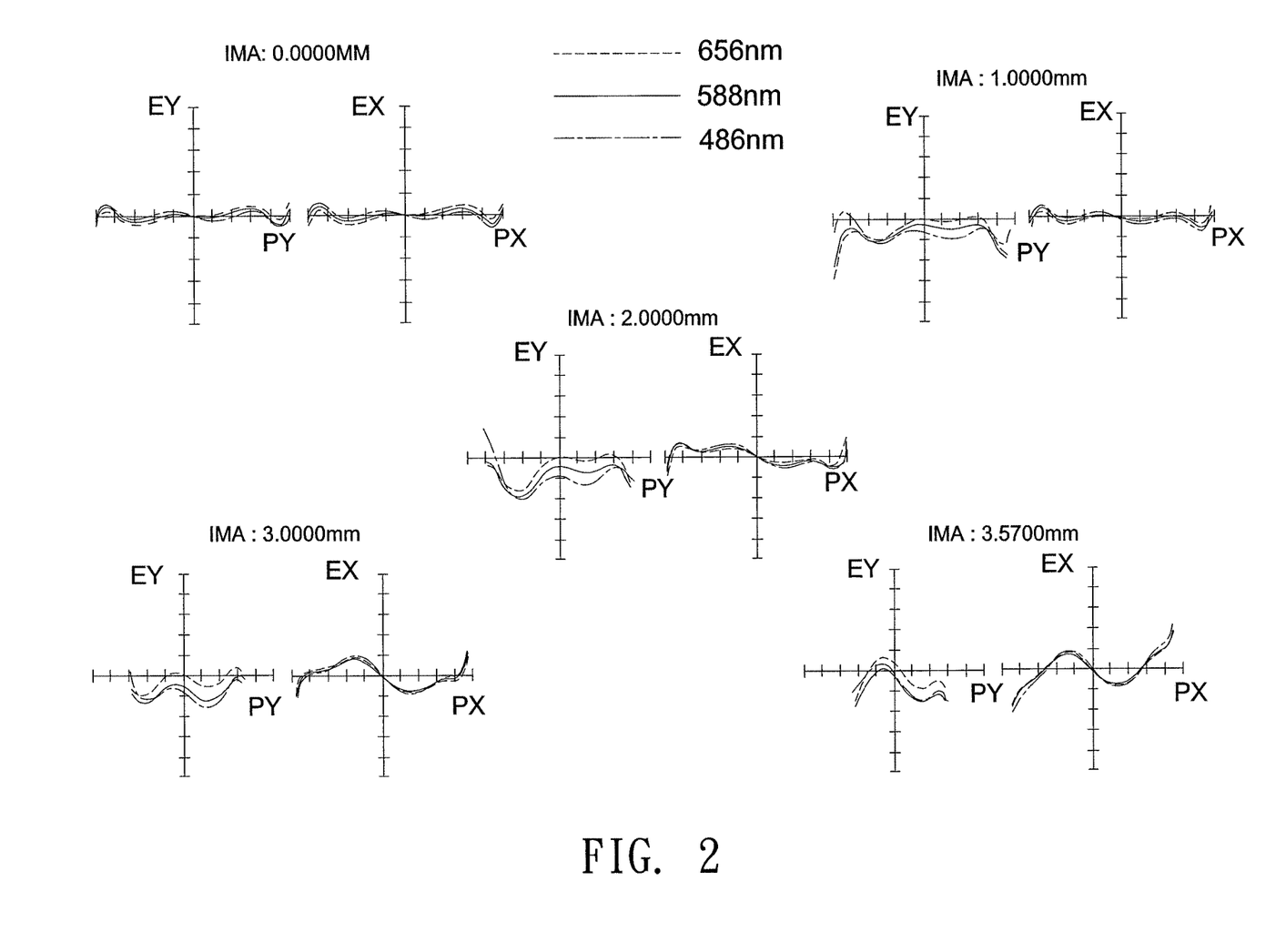
FIG. 2 and FIG. 3 are ray fan plots of the optical lens of FIG. 1 respectively for visible light and 850 nm infrared light.
Figure 3:
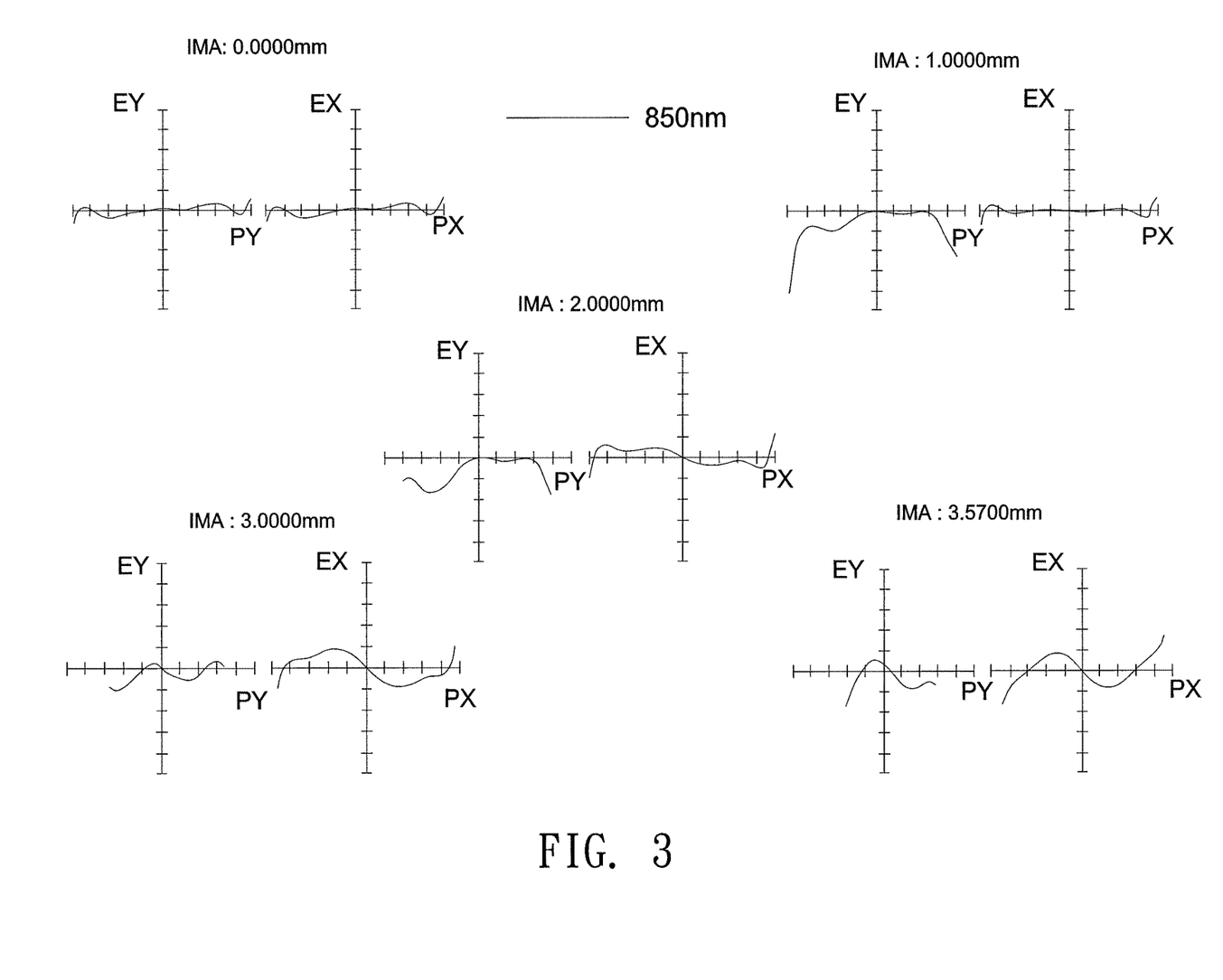
Figure 4:
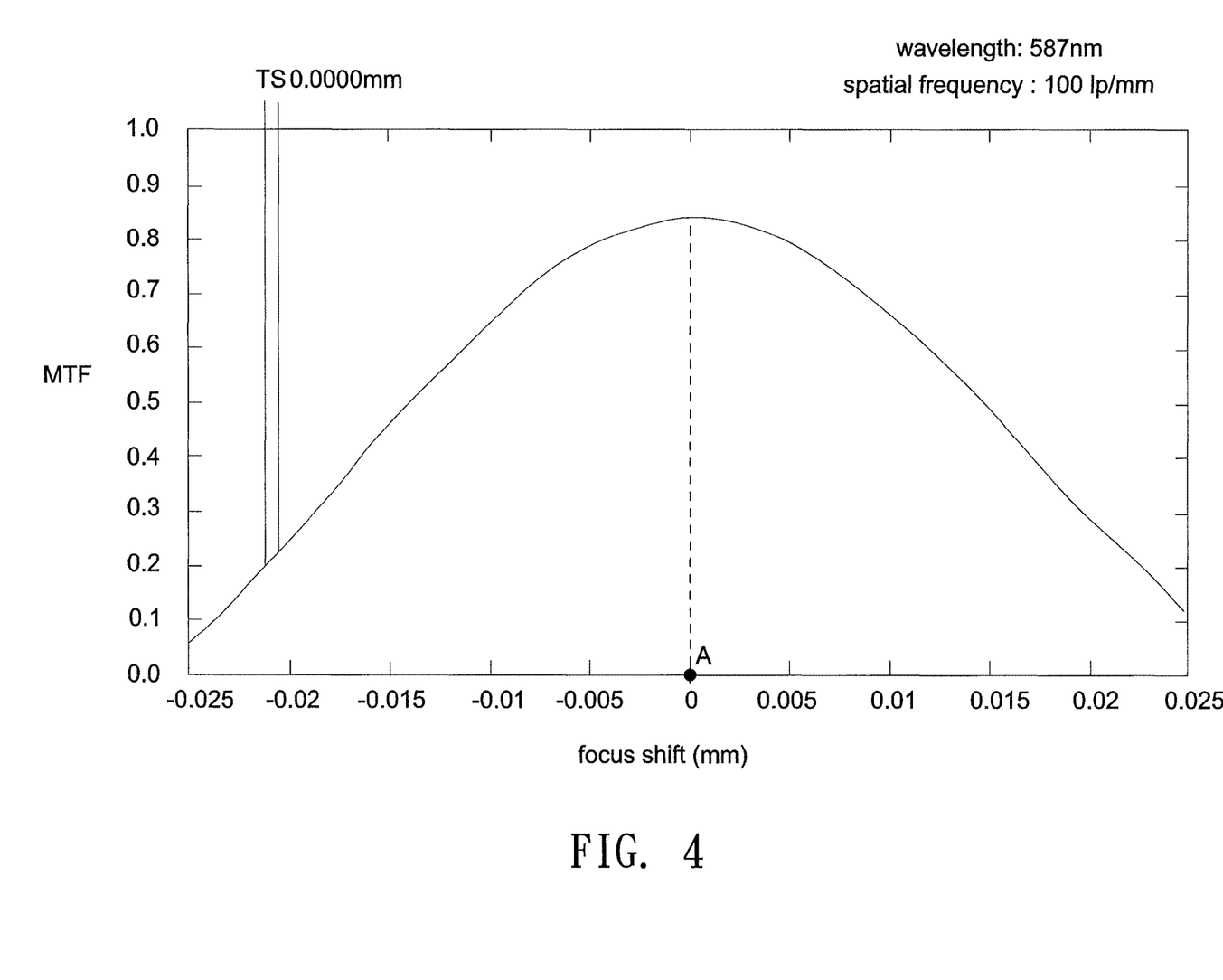
FIG. 4 depicts a diffractive MTF curve for 587 nm green light.
Figure 5:
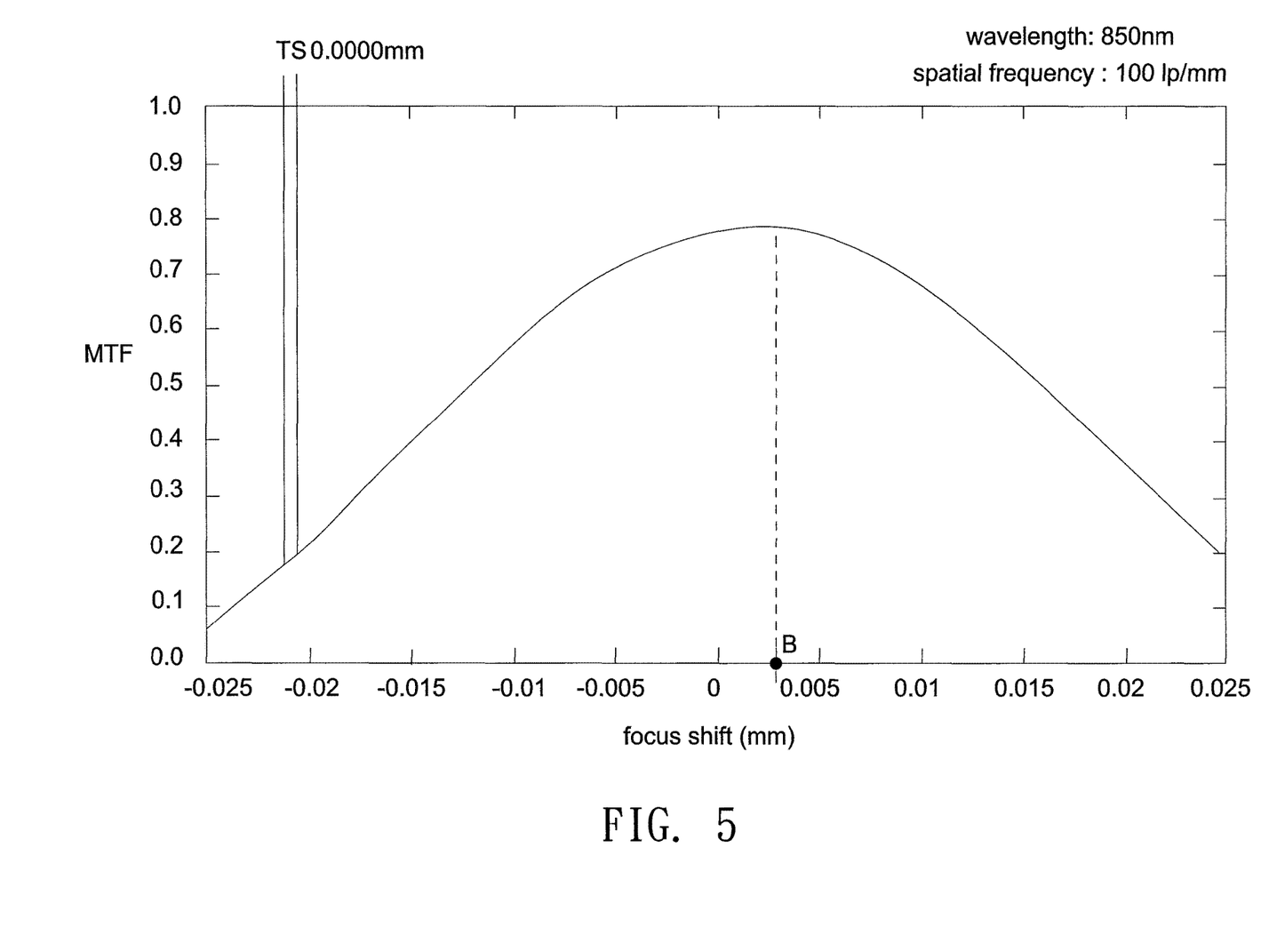
FIG. 5 depicts a diffractive MTF curve for 850 nm infrared light.
Figure 7:
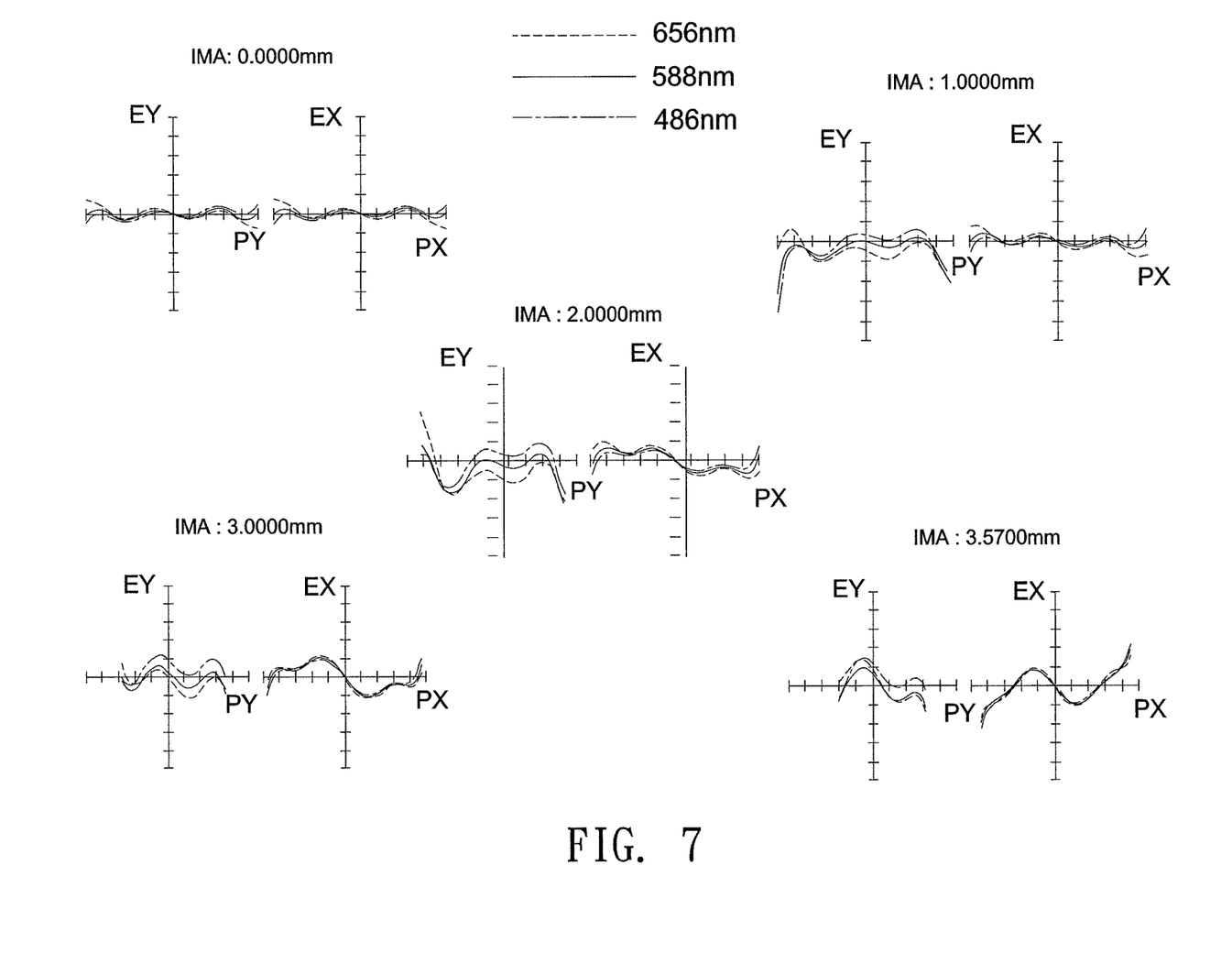
FIG. 7 and FIG. 8 are ray fan plots of the optical lens of FIG. 6 respectively for visible light and 850 nm infrared light.
Figure 8:
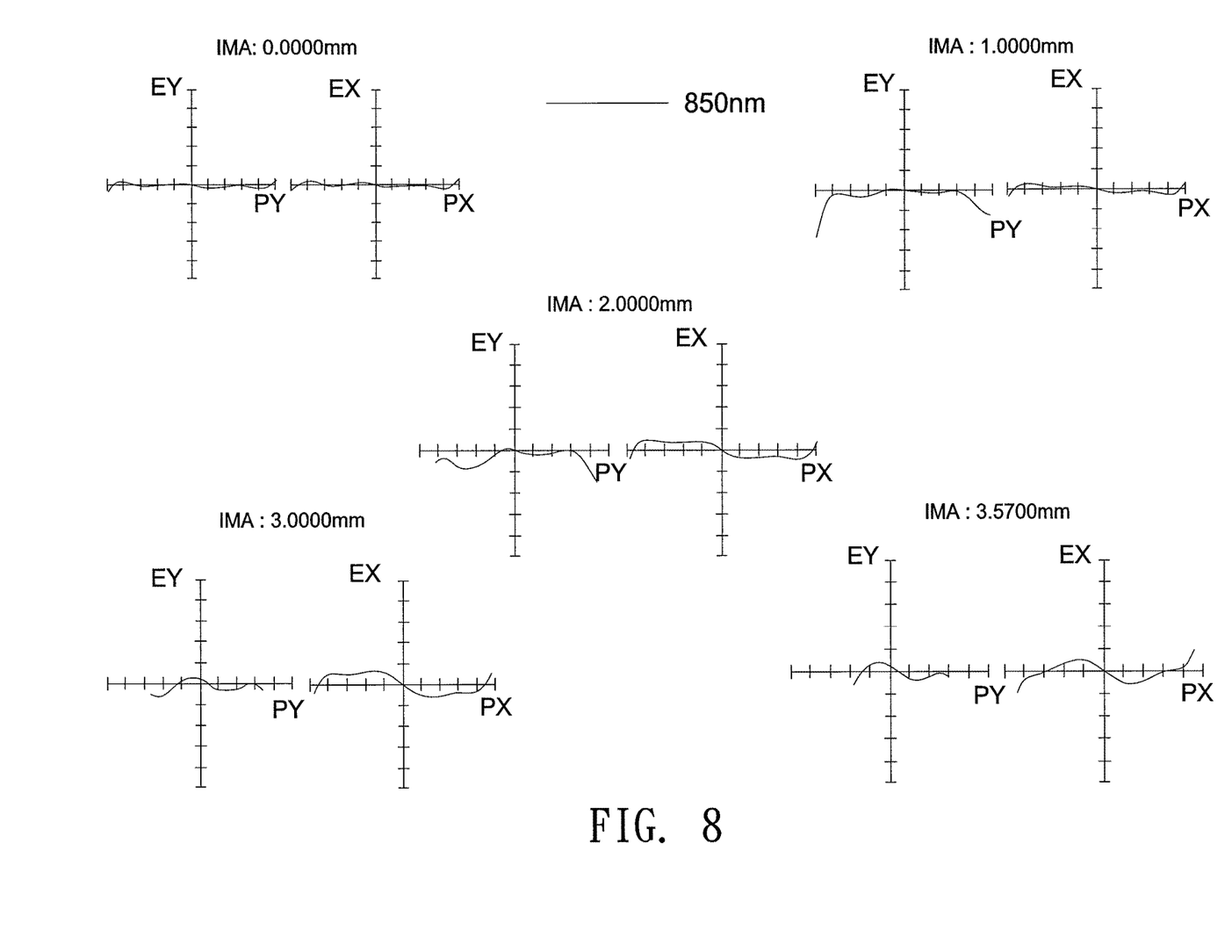
Figure 9:
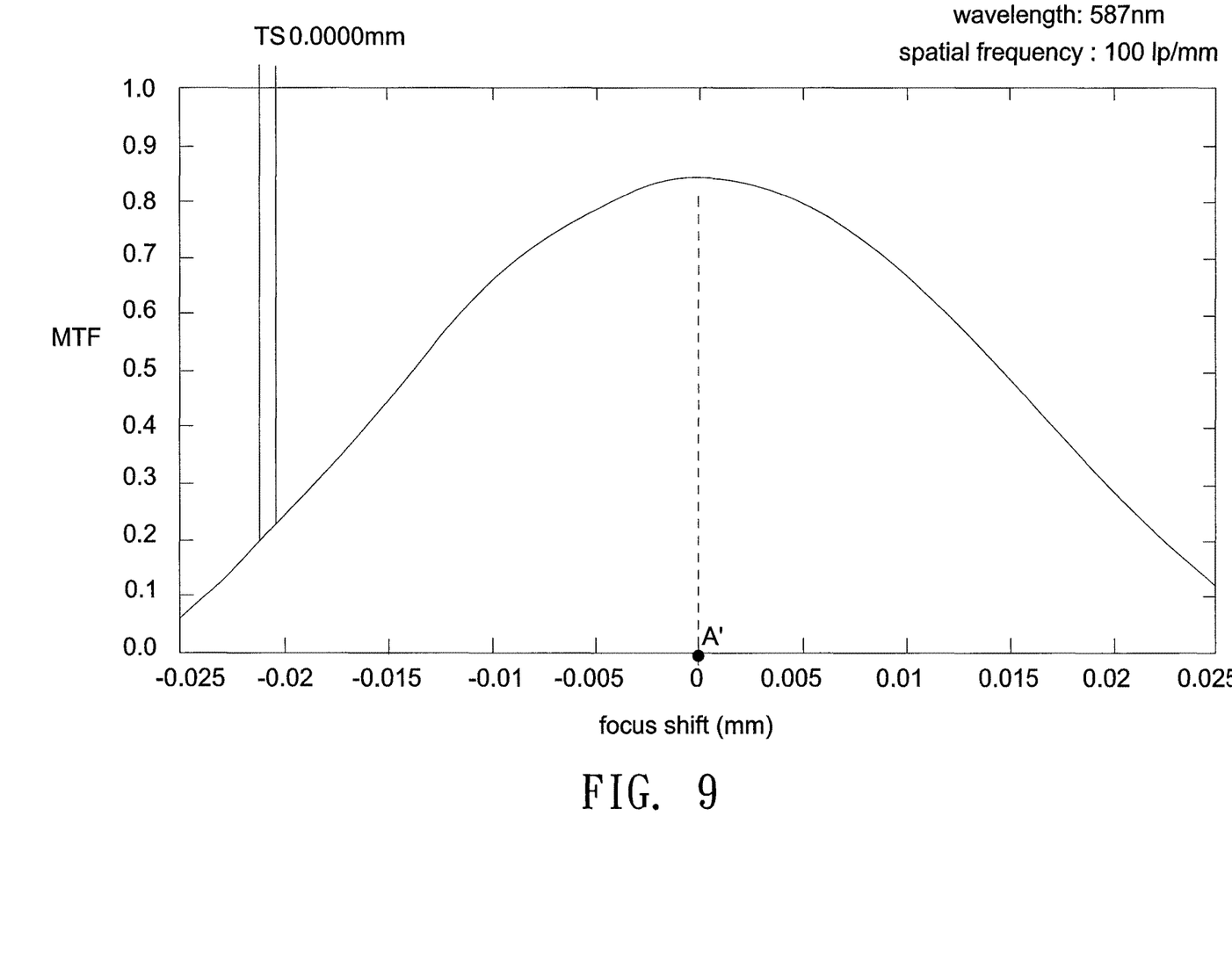
FIG. 9 depicts a diffractive MTF curve for 587nm green light.
Figure 10:
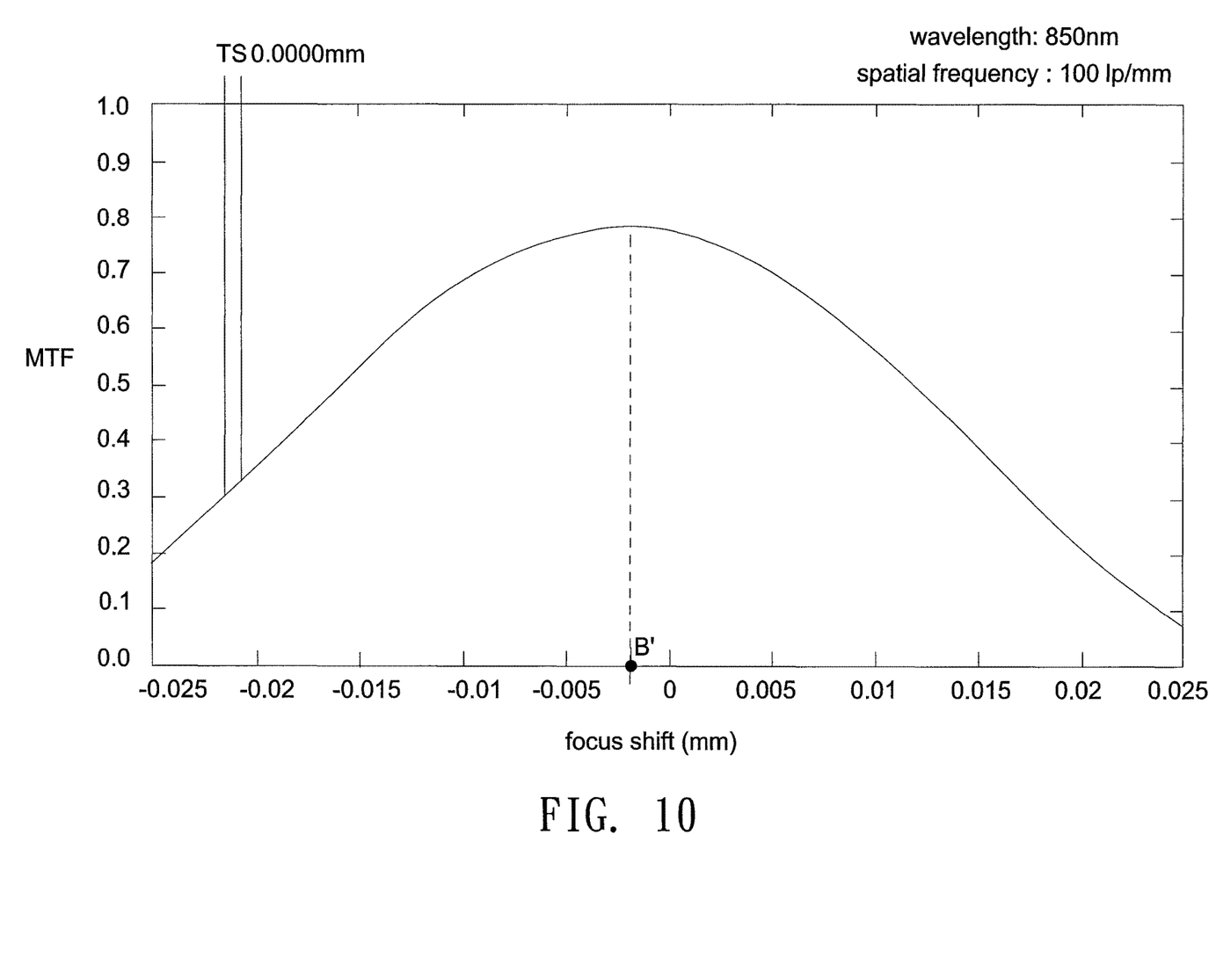
FIG. 10 depicts a diffractive MTF curve for 850 nm infrared light.

FIG. 2 and FIG. 3 are ray fan plots of the optical lens 10a of FIG. 1 respectively for visible light and 850 nm infrared light. FIG. 7 and FIG. 8 are ray fan plots of the optical lens 10b of FIG. 6 respectively for visible light and 850 nm infrared light. An abscissa of each ray fan plot represents entrance pupil positions, and an ordinate of the plot represents relative numerical values of positions on an image plane (such as the image plane 18) where main light beams are projected. FIG. 4 and FIG. 5 show optical simulation results of the optical lens 10a of FIG. 1. FIG. 9 and FIG. 10 show optical simulation results of the optical lens 10b of FIG. 6. Specifically, FIG. 4 depicts a diffractive MTF curve for 587 nm green light, and FIG. 5 depicts a diffractive MTF curve for 850 nm infrared light. The vertex of the MTF curve shown in FIG. 4 may be projected onto the X-axis to form a point A, and the vertex of the MTF curve shown in FIG. 5 may be projected onto the X-axis to form a point B. A distance on the X-axis between the point A and the point B is referred to as a focus shift of an infrared light focal plane relative to a visible light focal plane and is equal to about 3 um. FIG. 9 depicts a diffractive MTF curve for 587 nm green light, and FIG. 10 depicts a diffractive MTF curve for 850 nm infrared light. The vertex of the MTF curve shown in FIG. 9 may be projected onto the X-axis to form a point A', and the vertex of the MTF curve shown in FIG. 10 may be projected onto the X-axis to form a point B'. A distance on the X-axis between the point A' and the point B' is referred to as a focus shift of an infrared light focal plane relative to a visible light focal plane and is equal to about 2 um. In other words, the 587 nm green light may pass an optical lens to form a first focal plane, the first focal plane may cross an optical axis of the optical lens to form a first intersection, the 850 nm infrared light may pass the optical lens to faun a second focal plane, and the second focal plane may cross the optical axis of the optical lens to form a second intersection. In one embodiment, a displacement between the first intersection and the second intersection is less than 10 um, but the invention is not limited thereto. In other embodiment, a focus shift between the first focal plane and the second focal plane is less than 8 um. In an alternate embodiment, a focus shift between the first focal plane and the second focal plane is less than 6 um. Note the diffractive MTF curve for green light may be depicted according to a wavelength of 555 nm other than 587 nm; that is, a focal plane of 555 nm green light may also serve as a standard focal plane. The simulated results shown in FIGS. 2-5 and 7-10 are within permitted ranges specified by the standard, which indicates the optical lens 10a and 10b according to the above embodiments may achieve good imaging quality and 24-hours confocal image-capturing capability.

In one embodiment, an optical lens (such as the optical lens 10a and 10b) may include two lens groups and has an F number of 2.0, and the optical lens may have an aspheric lens with a diffractive optical surface to correct monochromatic and chromatic aberrations. Further, the optical lens may satisfy the following conditions:

$$0 < |(\Phi d * V)/\Phi r| < 2 \quad (3)$$

$$20 < V < 60 \quad (4)$$

$$|(0.5 * IMA)/(EFL * TAN(X)) - 1| < 0.45 \quad (5)$$

$$TTL/IMA < 3.5 \quad (6)$$

$$-0.006 < \Phi d/\Phi all < 0 \text{ and } \Phi all = 1/EFL \quad (7),$$

where $\Phi d$ denotes refractive power of a diffractive optical surface and equals C1/(−0.5) (Tables 3 and 6 list the value of C1), $\Phi r$ denotes refractive power of the aspheric lens with the diffractive optical surface, V denotes an Abbe number of the aspheric lens with the diffractive optical surface, EFL denotes an effective focal length for visible light of the optical lens, and $\Phi all$ denotes a reciprocal of the effective focal length EFL. Moreover, IMA denotes a maximum image circle of an image plane formed at an effective focal length for visible light, X denotes half of a maximum field of view, and TTL denotes a total track length (distance between the surface S1 and the image plane for visible light). Specifically, in case an optical lens is designed to meet the condition of $(\Phi d*V)/\Phi r > 2$, chromatic aberrations as a result of wavelength differences between infrared light and visible light is excessively corrected and a focal plane for infrared light is shortened. In comparison, in case an optical lens is designed to meet the condition of $(\Phi d*V)/\Phi r < -2$, it may indicate that the optical lens has large diffraction power and a diffractive micro structure with excessively amounts of circles to result in high fabrication complexities. Further, in case an optical lens satisfies the condition of $|(0.5*IMA)/(EFL*TAN(X))-1| > 0.45$, image distortions of the image plane formed at an effective focal length for visible light become large. Besides, in case an optical lens is designed to meet the condition of TTL/IMA>3.5, the occupied space of the optical lens is comparatively large and thus unfavorable for miniaturization. Therefore, the optical lens that satisfies the condition (3), (4), (5), (6) or (7) may achieve at least one advantage of good imaging quality, a high degree of miniaturization, low fabrication complexities, and 24-hours confocal image-capturing capability.

FIG. 11 shows a diffractive optical surface formed by a binary optics according to an embodiment of the invention. Here, a depth d of the diffractive optical surface 19 is defined as a shortest distance between a point C and a point D, where the point C is arbitrarily picked from a line connecting vertices of the diffractive optical surface and the point D is arbitrarily picked from a bottom line of the diffractive optical surface. In one embodiment, the depth d may be in the range of 0.29 um-2.5 um to achieve better diffraction efficiency, but the invention is not limited thereto. In another embodiment, the depth d may be in the range of 0.5 um-2.0 um, and preferably in the range of 0.8 um-1.8 um. In one embodiment, a total number of aspheric lenses is larger than a total number of spherical lenses in an optical lens. In one embodiment, a distance between an aperture stop and a diffractive optical surface is kept fixed.

According one embodiment of the invention, an optical lens includes a first lens group with negative refractive power, a second lens group with positive refractive power, and an aperture stop disposed between the first lens group and the second lens group. A total number of lenses in the first lens group is less than three, and a total number of lenses in the second lens group is less than five. The second lens group includes a first lens, a second lens and a third lens arranged in order in a direction away from the aperture stop. Each of the first lens and the second lens is an aspheric lens, and one of the first lens and the second lens has a diffractive optical surface.

According another embodiment of the invention, an optical lens includes a first lens group, a second lens group, and an aperture stop disposed between the first lens group and the second lens group. The first lens group includes a lens having negative refractive power, and the second lens group includes a lens having positive refractive power. The second lens group includes a first lens, a second lens and a third lens arranged in order in a direction away from the aperture stop. The first lens is an aspheric lens, and one of the first lens and the second lens has a diffractive optical surface. A 587 nm green light passes the optical lens to form a first focal plane, the first focal plane crosses an optical axis of the optical lens to form a first intersection, a 850 nm infrared light passes the optical lens to form a second focal plane, the second focal plane crosses the optical axis of the optical lens to form a second intersection, and a displacement between the first intersection and the second intersection is less than 10 um.

The optical lens according to the above embodiment may achieve at least one advantage of lighter weight, lower fabrication costs, good imaging quality and 24-hours confocal image-capturing capability.

The foregoing description of the preferred embodiments of the invention has been presented for purposes of illustration and description. It is not intended to be exhaustive or to limit the invention to the precise faun or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens, comprising:
a first lens group with negative refractive power and a second lens group with positive refractive power, a total number of lenses in the first lens group being less than three, and a total number of lenses in the second lens group being less than five; and
an aperture stop disposed between the first lens group and the second lens group, the second lens group comprising a first lens, a second lens and a third lens arranged in order in a direction away from the aperture stop, each of the first lens and the second lens being an aspheric lens, and one of the first lens and the second lens having a diffractive optical surface satisfies the condition:

$0<|(\Phi d*V)/\Phi r|<2$; and $\Phi d>0$, where $\Phi d$ denotes refractive power of the diffractive optical surface, $\Phi r$ denotes refractive power of the lens having the diffractive optical surface, and V denotes an Abbe number of the lens having the diffractive optical surface.

2. The optical lens as claimed in claim 1, wherein the lens having the diffractive optical surface satisfies the condition:

$20<V<60$, where V denotes an Abbe number of the lens having the diffractive optical surface.

3. The optical lens as claimed in claim 1, wherein a depth of the diffractive optical surface is in the range of 0.29 um-2.5 um.

4. The optical lens as claimed in claim 1, wherein the second lens group comprises an aspheric lens with negative refractive power, an aspheric lens with positive refractive power, and a spherical lens with positive refractive power.

5. The optical lens as claimed in claim 1, wherein the optical lens comprises five lenses arranged in order along an optical axis, and refractive powers of the five lenses are negative, positive, positive, negative, positive.

6. The optical lens as claimed in claim 1, wherein the optical lens satisfies the condition:

$|(0.5*IMA)/(EFL*TAN(X))-1|<0.45$, where EFL denotes an effective focal length for visible light of the optical lens, IMA denotes a maximum image circle diameter of an image plane formed at the effective focal length for visible light, and X denotes half of a maximum field of view.

7. The optical lens as claimed in claim 1, wherein the optical lens satisfies the condition:

$TTL/IMA<3.5$, where TTL denotes a total track length of the optical lens, and IMA denotes a maximum image circle diameter of an image plane formed at an effective focal length for visible light.

8. The optical lens as claimed in claim 1, wherein the optical lens satisfies the condition:

$0<\Phi d/\Phi all <0.006$ and $\Phi all=1/EFL$, where $\Phi d$ denotes refractive power of the diffractive optical surface, EFL denotes an effective focal length for visible light of the optical lens, and $\Phi all$ denotes a reciprocal of the effective focal length for visible light of the optical lens.

9. The optical lens as claimed in claim 1, wherein a distance between the aperture stop and the diffractive optical surface is kept fixed.

10. An optical lens, comprising:
a first lens group comprising a lens having negative refractive power;
a second lens group comprising a lens having positive refractive power; and
an aperture stop disposed between the first lens group and the second lens group, the second lens group comprising a first lens, a second lens and a third lens arranged in order in a direction away from the aperture stop, the first lens being an aspheric lens, one of the first lens and the second lens having a diffractive optical surface, wherein the optical lens has a focus shift of less than 10 um, the focus shift is defined as a displacement between a first intersection and a second intersection, the first intersection is formed by an optical axis of the optical lens crossing a first focal plane that results from a 587nm green light passing the optical lens, the second intersection is formed by the optical axis of the optical lens crossing a second focal plane that results from a 850 nm infrared light passing the optical lens, and the optical lens satisfies the conditions of $0<\Phi d/\Phi all<0.006$ and $\Phi all=1/EFL$, where $\Phi d$ denotes refractive power of the entire diffractive optical surface, EFL denotes an effective focal length for visible light of the optical lens, and $\Phi all$ denotes a reciprocal of the effective focal length for visible light of the optical lens.

11. The optical lens as claimed in claim 10, wherein the lens having the diffractive optical surface satisfies the condition:

$$0<|(\Phi d*V)\Phi r|<2,$$

where $\Phi d$ denotes refractive power of the entire diffractive optical surface, $\Phi r$ denotes refractive power of the lens having the diffractive optical surface, and V denotes an Abbe number of the lens having the diffractive optical surface.

12. The optical lens as claimed in claim 10, wherein the lens having the diffractive optical surface satisfies the condition:

$$20<V<60,$$

where V denotes an Abbe number of the lens having the diffractive optical surface.

13. The optical lens as claimed in claim 10, wherein a depth of the diffractive optical surface is in the range of 0.29 um-2.5 um.

14. The optical lens as claimed in claim 10, wherein the second lens group comprises an aspheric lens with negative refractive power, an aspheric lens with positive refractive power, and a spherical lens with positive refractive power.

15. The optical lens as claimed in claim 10, wherein the optical lens comprises five lenses arranged in order along an optical axis, and refractive powers of the five lenses are negative, positive, positive, negative, positive.

16. The optical lens as claimed in claim 10, wherein the optical lens satisfies the condition:

$$|(0.5*IMA)/(EFL*TAN(X))-1|<0.45,$$

where EFL denotes an effective focal length for visible light of the optical lens, IMA denotes a maximum image circle diameter of an image plane formed at the effective focal length for visible light, and X denotes half of a maximum field of view.

17. The optical lens as claimed in claim 10, wherein the optical lens satisfies the condition:

$$TTL/IMA<3.5,$$

where TTL denotes a total track length of the optical lens, and IMA denotes a maximum image circle of an image plane formed at an effective focal length for visible light.

18. The optical lens as claimed in claim 10, wherein a total number of aspheric lenses is larger than a total number of spherical lenses in the optical lens.

* * * * *